(12) United States Patent
Kim et al.

(10) Patent No.: US 10,631,361 B2
(45) Date of Patent: Apr. 21, 2020

(54) METHOD AND APPARATUS FOR PROVIDING USER WITH INFORMATION RECEIVED BY ELECTRONIC DEVICE

(71) Applicant: Samsung Electronics Co., Ltd., Suwon-si, Gyeonggi-do (KR)

(72) Inventors: Seoktae Kim, Daejeon (KR); Hyunmi Park, Seoul (KR); Hyeyeon Son, Daejeon (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 185 days.

(21) Appl. No.: 14/474,707

(22) Filed: Sep. 2, 2014

(65) Prior Publication Data

US 2015/0065035 A1 Mar. 5, 2015

(30) Foreign Application Priority Data

Sep. 3, 2013 (KR) ........................ 10-2013-0105775

(51) Int. Cl.
*H04B 7/24* (2006.01)
*H04W 84/10* (2009.01)
*H04W 52/02* (2009.01)

(52) U.S. Cl.
CPC ....... *H04W 84/10* (2013.01); *H04W 52/0209* (2013.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
CPC ..... H04W 76/02; H04W 84/10; H04W 68/00; H04W 84/20; H04W 84/18; H04W 88/06; H04M 1/0214; H04M 1/72527

USPC ........................ 455/41.2, 67.11, 412.2, 575.3
See application file for complete search history.

(56) References Cited

U.S. PATENT DOCUMENTS

| | | | | |
|---|---|---|---|---|
| 5,608,730 A | * | 3/1997 | Osakabe | H04B 1/205 370/471 |
| 7,395,089 B1 | * | 7/2008 | Hawkins | H04M 1/0245 455/556.1 |
| 7,499,977 B1 | * | 3/2009 | Valluru | H04Q 3/0075 370/386 |
| 7,873,646 B2 | * | 1/2011 | Yach | G06F 9/542 455/412.2 |
| 8,175,232 B2 | * | 5/2012 | Locker | H04M 1/64 379/88.18 |

(Continued)

FOREIGN PATENT DOCUMENTS

| | | |
|---|---|---|
| JP | 2006-165621 A | 6/2006 |
| KR | 10-2010-0034407 A | 4/2010 |
| KR | 10-2013-0089389 A | 8/2013 |

*Primary Examiner* — April G Gonzales
(74) *Attorney, Agent, or Firm* — Jefferson IP Law, LLP (57) ABSTRACT

A notification (information) provision method and an apparatus for providing a user with the information received through a connection using a communication protocol available between two different electronic devices is provided. The method includes establishing a communication path with at least one other electronic device using a communication protocol, detecting, when a notification (information) is received, the current state of the electronic device, displaying, when the current state is a first mode, the notification (information), and transmitting, when the current state is a second mode, the notification (information) to the other electronic device through the communication path.

22 Claims, 6 Drawing Sheets

(56) References Cited

U.S. PATENT DOCUMENTS

| | | | |
|---|---|---|---|
| 8,379,060 B2* | 2/2013 | Kwong | G09G 5/00 345/102 |
| 8,611,315 B2* | 12/2013 | Hamada | H04W 72/02 370/338 |
| 2003/0162531 A1* | 8/2003 | Yahiro | H04W 8/005 455/41.2 |
| 2006/0055958 A1* | 3/2006 | Kim | H04L 29/06 358/1.14 |
| 2008/0144601 A1* | 6/2008 | Nurminen | H04L 67/1095 370/350 |
| 2008/0304688 A1* | 12/2008 | Kumar | G06F 1/1616 381/370 |
| 2009/0239470 A1* | 9/2009 | Sherman | H04W 76/10 455/41.2 |
| 2009/0245485 A1* | 10/2009 | Locker | H04M 1/64 379/88.22 |
| 2010/0075600 A1* | 3/2010 | Haartsen | H04W 88/06 455/41.2 |
| 2010/0099385 A1* | 4/2010 | Mousseau | H04M 1/6505 455/412.2 |
| 2011/0081858 A1* | 4/2011 | Tolentino | H04B 15/00 455/41.2 |
| 2011/0111765 A1* | 5/2011 | Yang | H04W 72/0486 455/452.1 |
| 2012/0295614 A1* | 11/2012 | Sherman | H04W 76/10 455/426.1 |
| 2013/0017789 A1* | 1/2013 | Chi | G02B 27/01 455/41.2 |
| 2013/0078959 A1* | 3/2013 | Reeves | G02B 6/0001 455/412.2 |
| 2013/0203353 A1* | 8/2013 | Kim | H04B 7/24 455/41.2 |
| 2013/0219201 A1* | 8/2013 | Luo | G01S 19/34 713/323 |
| 2013/0288600 A1* | 10/2013 | Kuusilinna | H02J 7/0004 455/41.2 |
| 2014/0002408 A1* | 1/2014 | Abbate | G06F 3/03547 345/174 |
| 2014/0016799 A1* | 1/2014 | Kumar | H04R 1/04 381/122 |
| 2014/0269614 A1* | 9/2014 | Maguire | H04W 4/80 370/331 |
| 2014/0273975 A1* | 9/2014 | Barat | G06F 15/17312 455/412.2 |
| 2015/0078363 A1* | 3/2015 | Sherman | H04W 76/10 370/338 |

\* cited by examiner

METHOD AND APPARATUS FOR PROVIDING USER WITH INFORMATION RECEIVED BY ELECTRONIC DEVICE

CROSS-REFERENCE TO RELATED APPLICATION(S)

This application claims the benefit under 35 U.S.C. § 119(a) of a Korean patent application filed on Sep. 3, 2013 in the Korean Intellectual Property Office and assigned Serial number 10-2013-0105775, the entire disclosure of which is hereby incorporated by reference.

TECHNICAL FIELD

The present disclosure relates to a method and an apparatus for providing a user with information received by an electronic device. More particularly, the present disclosure relates to a method for providing the user with the information received through a connection established using a communication protocol available between two different electronic devices.

BACKGROUND

With rapid advancements in electronics and communication technologies, various types of portable electronic devices are manufactured to meet different tastes of potential users. Such electronic devices support at least one of wired and wireless communication protocols. For example, an electronic device is designed so as to communicate with computers or other types of electronic devices through a wired or wireless connection. Examples of the portable electronic devices include a smartphone, a tablet computer, an electronic dictionary, a smart watch, a laptop computer, and the like.

The aforementioned electronic devices are capable of communications using a wired or wireless communication protocol, such as Bluetooth (BT), Wireless Fidelity (Wi-Fi), Wi-Fi Direct. As well as the portable electronic devices, the non-portable electronic devices, such as desktop computer and smart television may also be capable of communicating with other electronic device using the wired and/or wireless communication protocols.

For the portable devices, it is important to reduce consumption of electric current. This is because the portable electronic devices are not connected to a fixed power source but battery power. Accordingly, in the state that a plurality of portable electronic devices are connected to each other through wired and/or wireless communication links, if any notification (information) occurs at one of the electronic devices, it is preferred to present the notification to the user through the most user-accessible electronic device other than all the devices.

In the case that any notification (information) occurs at one of the electronic devices of the related art connected to each other through wired and/or wireless communication links, however, all the electronic devices present the notification to the user simultaneously.

Accordingly, the portable electronic devices of the related art consume electric current redundantly, thereby shortening battery lifespan of the electronic devices. Furthermore, such a collective notification cause even the electronic device which is not carried by consume power, resulting in unnecessary power waste.

Therefore, there is a need for a notification provision method and an apparatus that is capable of allowing, when a notification (information) is received by one of a plurality of electronic devices that are connected through wired and/or wireless communication links, the concerned electronic device provide the user with the notification (information).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a notification provision method and an apparatus that is capable of allowing, when a notification (information) is received by one of a plurality of electronic devices that are connected through wired and/or wireless communication links, the concerned electronic device provide the user with the notification (information).

Another aspect of the present disclosure is to provide a notification provision method and an apparatus that is capable of providing, when a notification (information) is received by one of a plurality of electronic devices that are connected through wired and/or wireless communication links, the user with the notification depending on the states of the electronic devices.

Another aspect of the present disclosure is to provide a notification provision method and an apparatus that is capable of reducing unnecessary notification (information) in a situation where of a plurality of electronic devices that are connected through wired and/or wireless communication links.

Another aspect of the present disclosure is to provide a notification provision method and an apparatus that is capable of reducing power consumption in a situation in a situation where of a plurality of electronic devices that are connected through wired and/or wireless communication links.

In accordance with an aspect of the present disclosure, a method for providing a user with information received by an electronic device is provided. The method includes establishing a communication path with at least one other electronic device using a communication protocol, detecting, when a notification (information) is received, the current state of the electronic device, displaying, when the current state is a first mode, the notification (information), and transmitting, when the current state is a second mode, the notification (information) to the other electronic device through the communication path.

In accordance with another aspect of the present disclosure, an apparatus for providing a user with notification (information) received from a server is provided. The apparatus includes a first communication unit configured to receive the notification from the server, a second communication unit configured to communicate with at least one other electronic device using a communication protocol, a display unit configured to display a state of the electronic device and operation progress, an input unit configured to generate a signal corresponding to an input made by a user, and a control unit configured to control the second communication unit to establish a communication path with at least one other electronic device using a communication protocol, to detect, when a notification (information) is received through the first communication unit, the current state of the electronic device, to control the display unit to display, when the current state is a first mode, the notification (information), and to control the second communication unit to transmit, when the current state is a second mode, the notification (information) to the other electronic device through the communication path.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

It will be understood that the expressions "comprises" and "may comprise" is used to specify presence of disclosed function, operation, component, and the like, but do not preclude the presence of one or more functions, operations, components, and the like. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

In the present disclosure, the expression "and/or" is taken as specific disclosure of each and any combination of enumerated things. For example, A and/or B is to be taken as specific disclosure of each of A, B, and A and B.

As used herein, terms, such as "first," "second," and the like, are used to describe various components, however, it is obvious that the components should not be defined by these terms. For example, the terms do not restrict the order and/or importance of the corresponding components. The terms are used for distinguishing one component from another component. For example, a first component may be referred to as a second component and likewise, a second component may also be referred to as a first component, without departing from the teaching of the inventive concept.

It will be understood that when an element or layer is referred to as being "connected to" or "coupled to" another element or layer, it can be directly connected or coupled to the other element or layer or intervening elements or layers may be present. In contrast, when an element is referred to as being "directly on," "directly connected to" or "directly coupled to" another element or layer, there are no intervening elements or layers present. The terminology used herein is for the purpose of describing particular various embodiments and is not intended to be limiting of the disclosure. As used herein, the singular forms "a", "an" and "the" are intended to include the plural forms as well, unless the context clearly indicates otherwise.

According to various embodiments of the present disclosure, the electronic device may include devices equipped with a communication function. Examples of the electronic device may include a smartphone, a table Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Motion Pictures Expert Group (MPEG-1 or MPEG-2) Audio Layer 3 (MP3) player, a mobile medical appliance, an electronic bracelet, a camera, a wearable device, a wrist watch, a home appliance (e.g., a refrigerator, an air conditioner, an electronic oven, a microwave oven, a laundry machine, an air cleaner, and the like), an artificial intelligent robot, a Television (TV), a Digital Video Disk (DVD) player, an audio player, a medical device (e.g., Magnetic Resonance Angiography (MRA), Magnetic Resonance Imaging (MRI), Computed Tomography (CT), a moving camera, and an ultrasonic device), a Navigation device, a Global Positioning System (GPS) receiver, an Event Data Recorder (EDR), a Flight Data Recorder (FDR), a set-top box, a TV box (e.g., a Samsung HomeSync™, an apple TV™, and a google TV™), an electronic device, a car infotainment device, an electronic equipment for a ship (e.g., a maritime navigation device, a gyro compass, and the like), an aviation electronic device (avionics), a security device, an electronic key, a camcorder, a game console, a Head-Mounted Display (HMD), a flat panel display device, an electronic frame, an electronic album, a furniture and building/structure having a communication function, an electronic board, an electronic signature receive device, a projector, and any combination thereof. It is obvious to those skilled in the art that the electronic device is not limited to the aforementioned devices.

Figure 1:
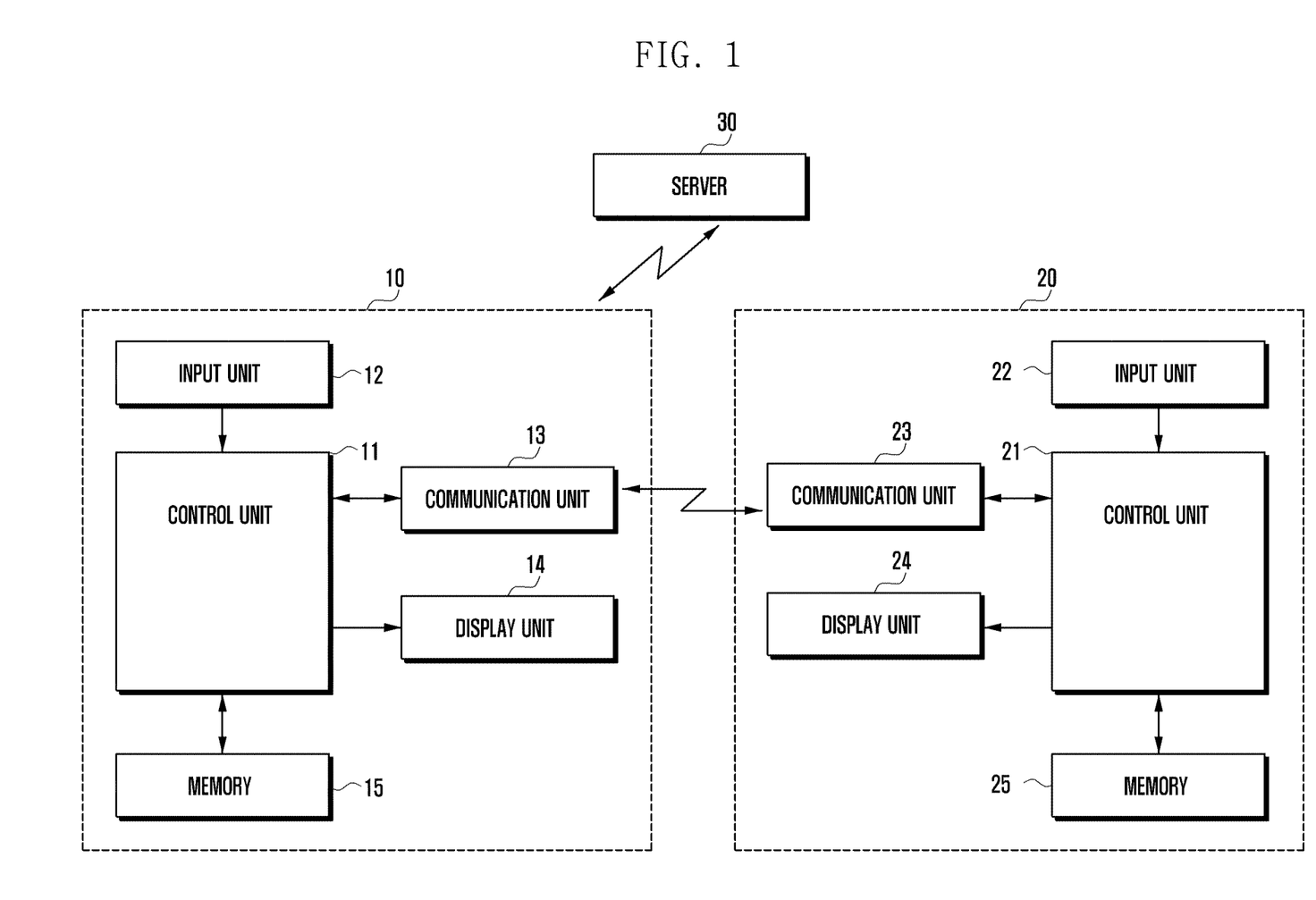
FIG. 1 is a block diagram illustrating a communication system including a first terminal and a second terminal connected through wired link and/or wirelessly according to an embodiment of the present disclosure.

FIG. 1 is a block diagram illustrating a communication system including a first terminal and a second terminal connected through wired link and/or wirelessly according to an embodiment of the present disclosure. FIG. 1 is directed to the case where the first terminal receives a notification (information).

Referring to FIG. 1, a first and second terminals 10 and 20 may communicate through a wired or wireless communication link established therebetween, and each of the terminals 10 and 20 may be an electronic device.

If it is necessary to transmit a notification (information) to the first terminal 10, a server 30 may transmit the notification (information) to the first terminal 10 through a network using a communication protocol. In the following, the description is made under the assumption that only first terminal 10 receives the notification (information) from the server 30. However, it will be understood that the second terminal 20 may receive the notification (information) from the server in the same manner. An embodiment of the present disclosure may be directed to the operation performed by the terminal (the first terminal 10 or the second terminal 20) receiving the notification (information) from the server 30. Accordingly, when the first and second terminals 10 and 20 receive messages from different servers through different networks, each of the first and second terminals 10 and 20 may perform the operations described hereinafter, respectively.

The first terminal 10 may include a control unit 11, an input unit 12, a communication unit 13, a display unit 14, and a memory 15. The second terminal 20 may include a control unit 21, an input unit 22, a communication unit 23, a display unit 24, and a memory 25.

The control unit 11 of the first terminal 10 controls overall operation of the first terminal 10 and, particularly when receiving a notification (information) is received, controls the operation of providing the user with the notification (information). A description of the operation of providing the user with the notification (information) is provided below with reference to accompanying flowchart.

The input unit 12 of the first terminal 10 is a module of generating a signal to the control unit 11 of the first terminal 100 in correspondence to the key pressed by the user, or touch input (such as 'touch and drag'), pen input, or EMR input made by the user.

The communication unit 13 is responsible for communication with the server 30 through a wired or wireless link and may receive the notification (information) from the server 30. If the notification (information) is received from the server 30 through a wireless communication link, the communication unit 13 of the first terminal 10 down-converts the received signal to the base band signal and converts the base band signal to a digital signal which is sent to the control unit 11 with or without being demodulated and decoded. The communication unit 13 may be responsible for communication with the second terminal 20 using a wired or wireless communication protocol. If it is required that the first terminal 100 receives the notification (information) from the server and transmits the notification (information) to the second terminal 30, the first terminal 10 may process the received notification (information) into a format available for communication protocol negotiated with the second terminal 100 and transmits the newly formatted notification (information) to the second terminal 20.

The display unit 14 may display the operation state of the first terminal 10 and present a progress of a requested operation and operation result to the user visually. The display unit 14 may include a vibration motor (not shown) for generating alarm and/or a speaker (not shown) for output the alarm sound, if necessary.

The memory 15 may be implemented with a volatile or non-volatile memory and may include a region for storing application programs associated with the operation of the first terminal, a region for storing data in response to the user request, a region for storing the notification (information) received from the server 30, and a region for storing control data for use in processing the received notification (information).

The second terminal 20 may have the same configuration as the first terminal 10 or be configured for the capability less or greater than that of the first terminal 10. In the present disclosure, the first and second terminals 10 and 20 are not restricted in capability. In addition, each of the first and second terminals 10 and 20 may have a configuration equal to or less or more than, in number of components, that of the device of any of FIGS. 2, 3, and 4.

Figure 2:
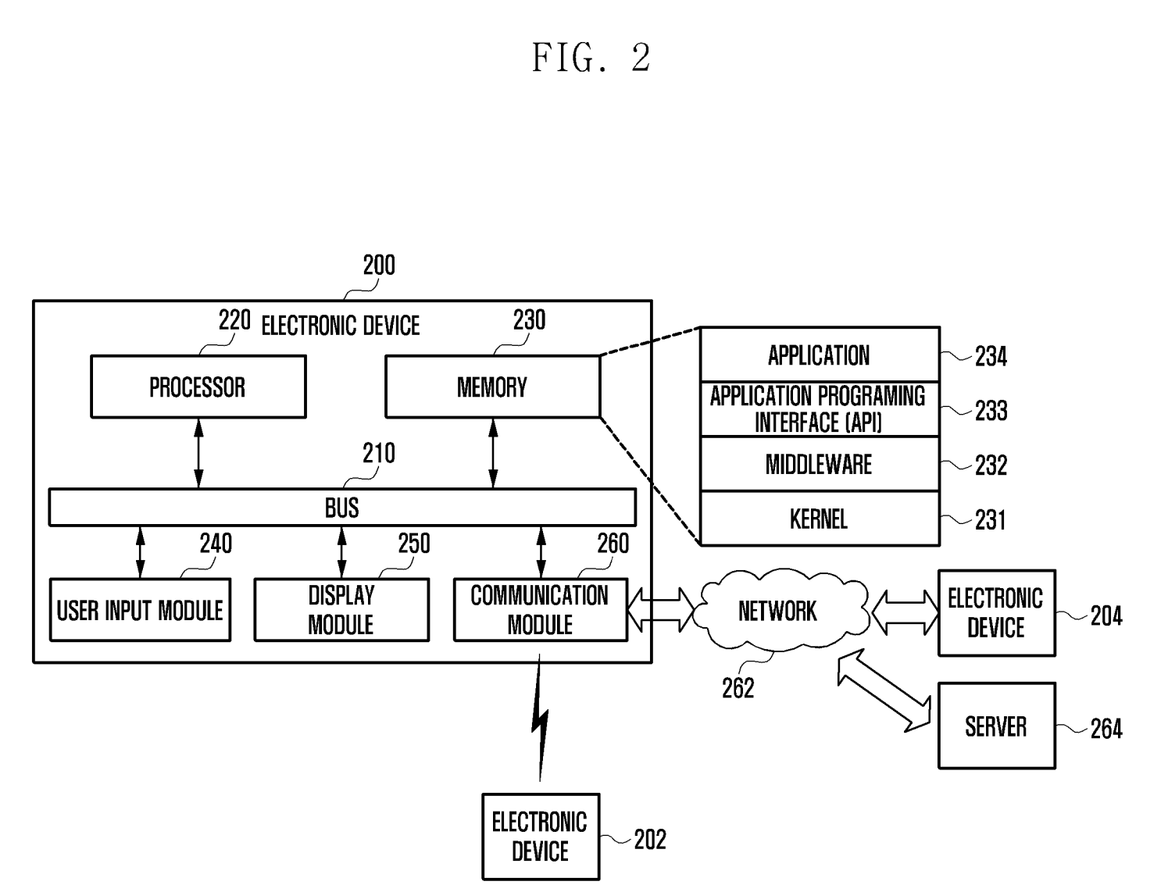
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an electronic device 200 may include a bus 210, a processor 220, a memory 230, a user input module 240, a display module 250, and a communication module 260.

The bus 210 may be a circuit connecting the aforementioned components each other for communicating signals (e.g., control messages) therebetween.

The processor 220 may receive a command from other components (i.e., memory 230, user input module 240, display module 250, and communication module 260), decodes the received command, and perform operation and data processing according to the decoded command.

The memory 230 may store the command or data received from or generated by the processor 220 or other components (i.e., user input module 240, display module 250, and communication module 260). The memory 230 may include programing modules, such as a kernel 231, a middleware, an Application Programming Interface (API) 233, applications 234, and the like. The programing modules may be implemented in the form of software, firmware, hardware, or any combination thereof.

The kernel 231 may control or manage the system resources (e.g., the bus 210, the processor 220, and the memory 230) for use in executing the operation or function implemented with a middleware 232, the API 233, or the application 234. The kernel 231 also may provide an interface allowing the middleware 232, API 233, or application 234 to access the components of the electronic device 200 to control or manage.

The middleware 232 may work as a relay of data communicated between the API 233 or application 234 and the kernel 231. The middleware 232 may perform load balancing to the task requests from the applications 234 in such a way of assigning priority for use of the system resource (e.g., the bus 210, the processor 220, and the memory 230) of the electronic device 200 to at least one of the applications 234.

The API 233 is the interface for the applications 234 to control the function provided by the kernel 231 or the middleware 232 and may include at least one interface or function (e.g., a command) for file control, a window control, an image control, a text control, and the like.

The user input module 240 may deliver the command or data input by the user to the processor 220 or the memory 230 through the bus 210. The display module 250 may display images, video, or data to the user.

The communication module 260 may establish a communication connection of the electronic device 200 with another electronic device. The communication module 260 may support at least one of communication protocols, such as Wireless Fidelity (Wi-Fi), Bluetooth (BT), Near Field Communication (NFC), Local Area Network (LAN), Wide Area Network (WAN), telecommunication network, cellular network, cellular network, Plain Old Telephone service, and the like. Electronic devices 202 and 204 may be identical, in type, with or different from the electronic device 200. A server 264 may transmit notification (information) to the electronic device 202 through a network 262 using a communication protocol.

Figure 3:
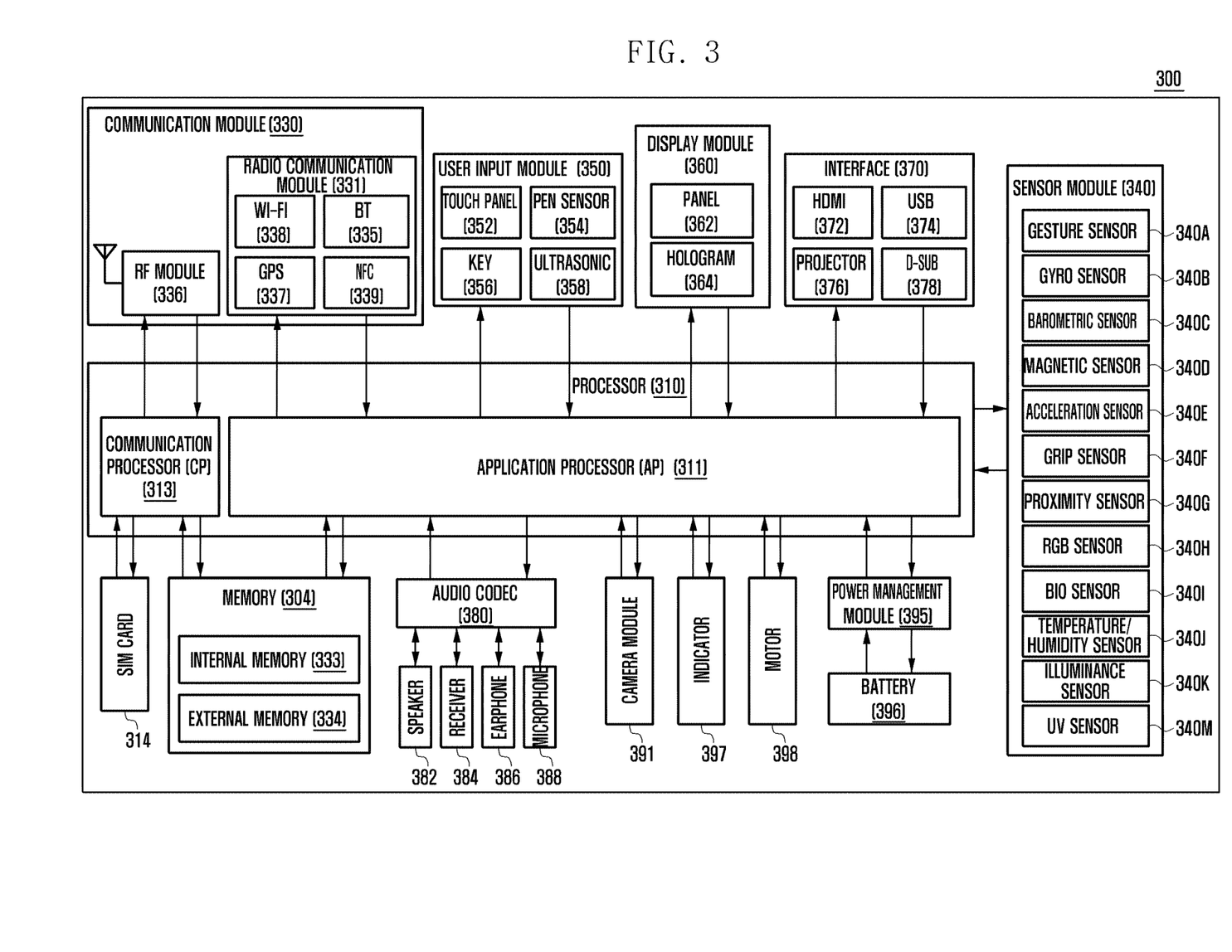
FIG. 3 is a block diagram illustrating a hardware configuration of an electronic device according to an embodiment of the present disclosure.

FIG. 3 is a block diagram illustrating a hardware configuration of an electronic device according to an embodiment of the present disclosure.

Referring to FIG. 3, a hardware 300 may be of the first terminal 10 or the second terminal 20 of FIG. 1 or the electronic device 200 of FIG. 2.

As shown in FIG. 3, the hardware 300 includes at least one processor 310, a Subscriber Identity Module (SIM) card 314, a memory 304, a communication module 330, a sensor module 340, a user input module 350, a display module 360, an interface 370, an audio codec 380, a camera module 391, a power management module 395, a battery 396, an indicator 397, and a motor 398.

The processor 310 may include at least one Application Processor (AP) 311 and at least one Communication Processor (CP) 313. The processor 310 may be the processor 220 of FIG. 1. Although the AP 311 and the CP 313 are included in the processor 310 in FIG. 3, they may be included in different IC packages. In an embodiment, the AP 311 and the CP 313 may be included in one IC package.

The AP 311 may operate an Operating System (OS) and/or application programs to control a plurality of hardware and/or software components connected to the AP 311 and perform data-processing and operations on multimedia data. For example, the AP 311 may be implemented in the form of System on Chip (SoC). According to an embodiment, the AP 311 may include a Graphic Processing Unit (GPU) (not shown).

The CP 313 may be responsible for managing data link in communication with other electronic device connected to the electronic device (e.g., the electronic device 10) including the hardware 300 through the network. The CP 313 may be implemented in the form of SoC. According to an embodiment, the CP 313 may be responsible for partial multimedia control function. The CP 313 may be responsible for terminal identification and authentication in the communication network using the SIM card 314. The CP 313 may provide the user with the communication services, such as voice communication, video communication, text messaging, packet data services, and the like.

The CP 313 also may control data communication of the communication module 330. Although the components, such as the CP 313, the power management module 395, and the memory 304 are depicted separately, the AP may include at least one of the aforementioned components (e.g., the CP 313).

According to an embodiment, the AP 311 or the CP 313 processes the command or data received from at least one of non-volatile memory or other components and then loaded on the volatile memory. The AP 311 or the CP 313 may store the data received from or generated by at least one of other components.

The SIM card 314 may be designed so as to be inserted into a slot formed at a position of the electronic device. The SIM card 314 may store unique identity information (e.g., an Integrated Circuit Card Identifier (ICCID)) or subscriber information (e.g., an International Mobile Subscriber Identity (IMSI)).

The memory 304 may include an internal memory 333 and an external memory 334. The memory 304 may be the memory 14 of the first terminal 10 or the memory 25 of the second terminal 20 in FIG. 1 or the memory 230 of FIG. 2. The internal memory 333 may include at least one of a volatile memory (e.g., a Dynamic Random Access Memory (DRAM), Static RAM (SRAM), Synchronous Dynamic RAM (SDRAM) or a non-volatile memory (e.g., a One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory). According to an embodiment, the internal memory 333 may be a Solid State Drive (SSD). The external memory 334 may be a flash drive, such as Compact Flash (CF), Secure Digital (SD), micro-SD, Mini-SD, extreme Digital (xD), Memory Stick, and the like.

The communication module 330 may include a radio communication module 331 and an RF module 336. The communication module 330 may include the communication unit 13 of the first terminal 10 and/or the communication unit 23 of the second terminal 20 of FIG. 1 and/or the communication module 260 of FIG. 2. The radio communication module 331 may include a Wi-Fi module 338, a BT module 335, a GPS module 337, and an NFC module 339. For example, the radio communication module 331 is responsible for radio communication on a radio frequency. Additionally or alternatively, the radio communication module 331 may include a network interface (e.g., a LAN card) or a modem for establishing a connection to the network (e.g., the Internet, LAN, WAN, telecommunication network, cellular network, satellite network, and Plain Old Telephone service (POTs) network).

The RF module 336 may be responsible for data communication, e.g., an RF signal or an electronic signal communication. Although not shown, the RF module 336 may include a transceiver, a Power Amp Module (PAM), a frequency filter, and a Low Noise Amplifier (LNA). The RF module 336 may further include elements for transmitting/receiving electric wave in free space, e.g., a conductor or a conductive wire.

The sensor module 340 may include a gesture sensor 340A, a Gyro sensor 340B, a barometric sensor 340C, a magnetic sensor 340D, an acceleration sensor 340E, a grip sensor 340F, a proximity sensor 340G, an RGB (Red, Green, Blue sensor 340H, a bio sensor 340I, a temperature/humidity sensor 340J, an illuminance sensor 340K, and an Ultra Violet (UV) sensor 340M. The sensor module 340 may measure physical quantity or detect the operation status of the electronic device 1201 and convert the measured or detected information to an electric signal. Additionally or alternatively, the sensor module 340 may include E-nose sensor (not shown), ElectroMyoGraphy (EMG) sensor (not shown), ElectroEncephaloGram (EEG) sensor (not shown), ElectroCardioGram (ECG) sensor (not shown), Infrared (IR) sensor (not shown), iris sensor (not shown), and fingerprint sensor (not shown). The sensor module 340 may further include a control circuit for controlling at least one of the sensors included therein.

The user input module 350 may include a touch panel 352, a (digital) pen sensor 354, keys 356, and an ultrasonic input device 358. The user input module 350 may be the input unit 12 of the first terminal 10 or the input unit 22 of the second terminal 20 of FIG. 1 or the user input module 240 of FIG. 2. The touch panel 352 may be one of capacitive, resistive, infrared, microwave type touch panel. The touch panel 352 may include a controller (not shown). In the case of the capacitive type touch panel, it is possible to detect physical contact or approximation. The touch panel 352 may further include a tactile layer. In this case, the touch panel 352 may provide the user with haptic reaction.

The (digital) pen sensor 354 may be implemented with a sheet with the same or similar way as touch input of the user or a separate recognition sheet. The keys 356 may be of keypad and touch pad. The ultrasonic input device 358 is a device capable of detecting data by detecting sound wave through a microphone 388 and may be implemented for wireless recognition. According to an embodiment, the hardware 300 may receive the user input made using an external device (e.g., a network, a computer, a server, and the like) connected through the communication module 330.

The display module 360 may include a panel 362 and a hologram device 364. The display module 360 may be the display unit 13 of the first terminal 10 or the display unit 24 of the second terminal 20 of FIG. 1 or the display module 250 of FIG. 2. The panel 362 may be a Liquid Crystal Display (LCD) panel or an Active Matrix Organic Light Emitting Diodes (AMOLED) panel. The panel 362 may be implemented so as to be flexible, transparent, and/or wearable. The panel 362 may be implemented as a module integrated with the touch panel 352. The hologram device 364 may present 3-dimensional image in the air using interference of light. According to an embodiment, the display 360 may include a control circuit for controlling the panel 362 and the hologram device 364.

The interface 370 may include a High-Definition Multimedia Interface (HDMI) 372, a Universal Serial Bus (USB) 374, a projector 376, and a D-subminiature (D-sub) 378. Additionally or alternatively, the interface 370 may include a Mobile High-definition Link (MHL) interface, a SD/MMC card interface, and infrared Data Association (irDA) standard interface. The interface 370 also may include the communication unit 13 of the first terminal 10 and/or the communication unit 23 of the second terminal 20 of FIG. 1.

The audio codec 380 may convert sound to electric signal and vice versa. The audio codec 380 may process the audio information input or output through a speaker 382, a receiver 384, an earphone 386, and a microphone 388.

The camera module 391 is a device capable of taking still and motion pictures and, according to an embodiment, includes at least one image sensor (e.g., front and rear sensors), Image Signal Processor (ISP) (not shown), and a flash LED (not shown).

The power management module 395 may manage the power of the hardware 300. Although not shown, the power management module 395 may include a Power Management Integrated Circuit (PMIC), a Charger Integrated Circuit (IC), and a battery gauge (battery fuel gauge).

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger and wireless charger ICs. Examples of the wireless charging technology includes resonance wireless charging and electromagnetic wave wireless charging, and there is a need of extra circuit for wireless charging, such as coil loop, resonance circuit, diode, and the like.

The battery gauge may measure the residual power of the battery 396, charging voltage, current, and temperature. The battery 396 may store or generate power and supply the stored or generated power to the electronic device 301. The battery 396 may include a rechargeable battery or a solar battery.

The indicator 397 may display operation status of the hardware 300 or a part of the hardware (AP 311), booting status, messaging status, and charging status. The motor 398 may convert the electronic signal to mechanical vibration.

Although not shown, the hardware 300 may include a processing unit (e.g., a GPU) for supporting mobile TV. The processing unit for supporting the mobile TV may be able to processing the media data abiding by the broadcast standards, such as Digital Multimedia Broadcasting (DMB), Digital Video Broadcasting (DVB), and media flow.

The above enumerated components of the hardware of the present disclosure may be implemented into one or more parts, and the names of the corresponding components may be changed depending on the kind of the electronic device. The electronic device of the present disclosure may include at least one of the aforementioned components with omission or addition of some components. The components of the electronic device of the present disclosure may be combined selectively into an entity to perform the functions of the components equally as before the combination.

The term "module" according to the various embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), and Programmable-Logic Device known or to be developed for certain operations.

Figure 4:
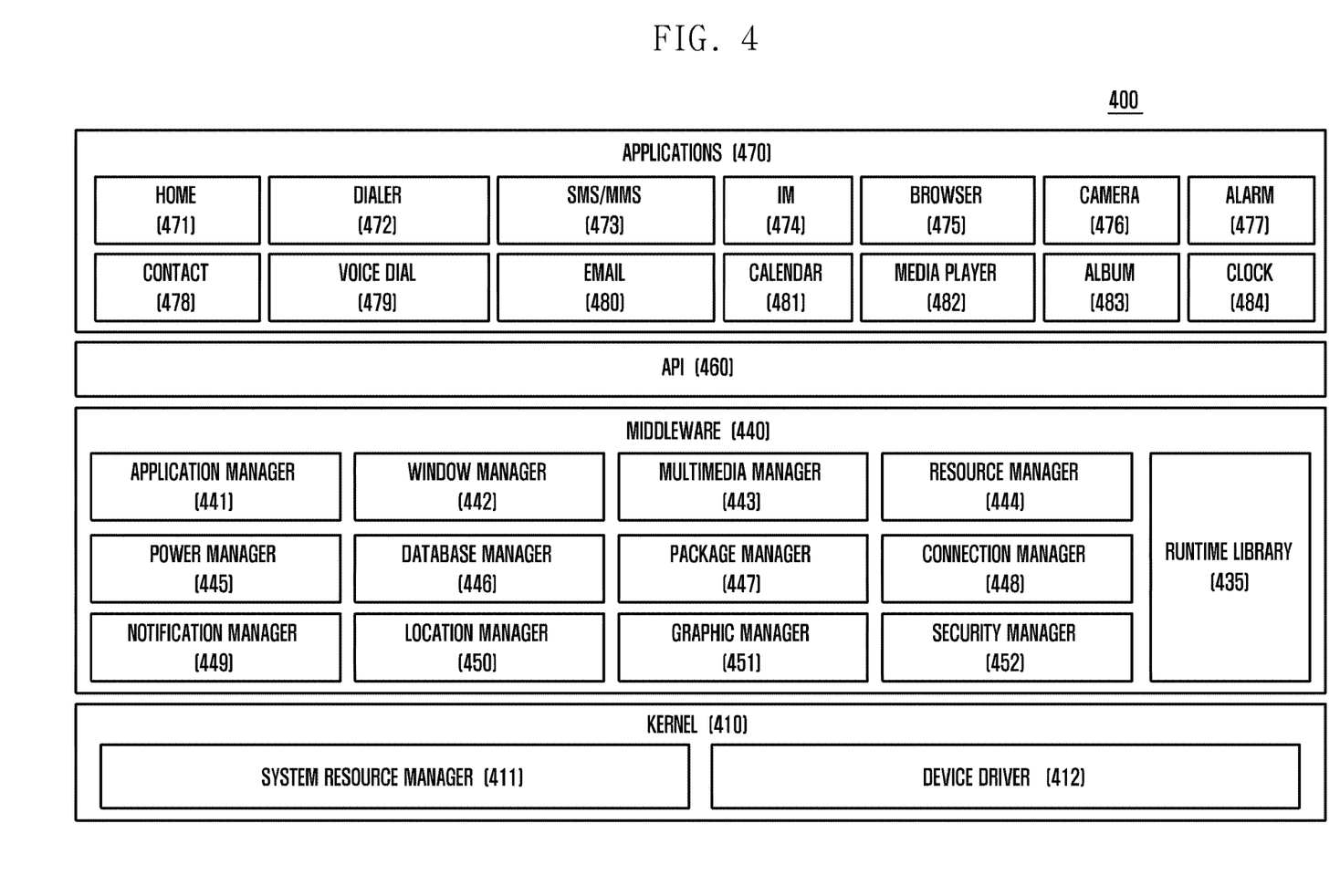
FIG. 4 is a block diagram illustrating a programing architecture according to an embodiment of the present disclosure.

FIG. 4 is a block diagram illustrating a programing architecture according to an embodiment of the present disclosure.

Referring to FIG. 4, a programing architecture 400 may be included (stored) in the first terminal 10 (e.g., the memory 15 of the first terminal 10) and/or the second terminal (e.g., the memory 25 of the second terminal 20) of FIG. 1 and/or the electronic device 20 (e.g., the memory 230) of FIG. 2. At least a part of the programing architecture 400 may be implemented with at least one of software, firmware, hardware, and any combination thereof. The programming architecture 400 may include an Operating System (OS) managing resources of the electronic device (e.g., the electronic device 200) implemented in hardware (e.g., the hardware 300) and various applications (e.g., applications 470) running on the OS. For example, the OS may be one of Android, iOS, Windows, Symbian, Tizen, and Bada. Referring to FIG. 4, the programming architecture 400 may include a kernel 410 may include the kernel 410, the middleware 440, the API 460, and the applications 470.

The kernel 410 (e.g., the kernel 231) may include System resource manager 411 and a device driver 412. The system resource manager 411 may include a processor manager, a memory manager, and a file system manager. The system resource manager 411 is responsible for system resource control, assignment, and withdrawal. The device driver 412 may include a display driver, a camera driver, a Bluetooth driver, a memory driver, a USB driver, a keypad driver, a Wi-Fi driver, and an audio driver. According to an embodiment, the device driver 412 may include an Inter-Process Communication (IPC) driver (not shown).

The middleware 440 may include a plurality of modules preconfigured for providing functionality necessary in common by the applications 470. The middleware 440 may provide the applications 470 with the functionalities through the API 460 to use the system resources efficiently. As shown in FIG. 4, the middleware 440 (e.g., the middleware 232) may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, and a security manager 452.

The runtime library 435 may include a library module used by the compiler to add new functions with the programing language during the execution of the applications 470. According to an embodiment, the runtime library 435 may execute input/output function, memory management function, or arithmetic function.

For example, the application manager 441 may manager the lifecycle of at least one of the applications 470. The window manager 442 may manager GUI resource used for embodying the screen. The multimedia manager 443 detects the formats of various multimedia files to be played and performs encoding and/or decoding the media files using the codecs corresponding to the formats. The resource manager 444 may manage the resource, such as the source code of at least one of the applications 470, a memory, a storage space, and the like.

The power manager 445 operates along with Basic Input/Output System (BIOS) to manager battery and power source and provides power information for operation. The database manager 446 may manager to create, search, and update the database to be used by at least one of the applications 470. The package manager 447 may manage to install and update applications distributed in the form of package files.

The connection manager 448 may manage radio connections, such as Wi-Fi and Bluetooth. The notification manager 449 may present or notify, to the user, the events, such as an incoming message, an appointment, a proximity notification in a way of not disturbing, and the like. The location manager 450 may manage the location information of the electronic device. The graphic manager 451 may manage the graphic effect and the user interface to be provided to the user. The security manager 452 may provide system security and user authentication-based security functions. According to an embodiment, in the case that the electronic device (e.g., the electronic device 200) is provided with the telephony function, the middleware 440 may further include a telephony manager (not shown) for managing the voice and/or video telephony function.

The middleware 440 may generates a new middleware module by combining the aforementioned internal component modules in various manners for a certain use. The middleware 440 may provide modules per OS to provide differentiated functions. The middleware 440 may delete certain components or add new components dynamically. For example, the present disclosure may be implemented with omission of some aforementioned components or additions of other components new or as replacements similar in function but different in name.

The API 460 (e.g., the API 233) is a set of API programing functions that may be configured differently depending on the OS. For example, Android or iOS may provide one API set per platform, while Tizen may provide two or more API sets.

The applications 470 (e.g., applications 234) may include preloaded applications and/or third party applications, such as a home application 471, a dialer application 472, a Short Message Service (SMS)/a Multimedia Message Service (MMS) application 473, an Instant Messenger (IM) application 474, a browser application 475, a camera application 476, an alarm application 477, a contact application 478, a voice dial application 479, an e-mail application 480, a calendar application 481, a media player application 482, an album application 483, and a clock application 484.

A part of the programing architecture 400 may be implemented with instructions stored in computer-readable storage media. In the case being executed by at least one processor (e.g., the processor 310), the at least one processor may execute the functions corresponding to the instructions. The computer-readable storage media may be the memory 230. At least a part of the programing architecture 400 may be implemented (or executed) by the processor 310. A part of the programing architecture 400 may include modules, programs, routines, sets of instructions and/or processes for executing at least one function.

The components of the programing architecture 400 of the present disclosure may be entitled differently depending on the type of OS. The programing architecture of the present disclosure may be implemented with or without inclusion at least one of the aforementioned components or with other additional components. The operations of the programing module and other components may be processed in series, in parallel, recursively, or heuristically with or without inclusion of any of aforementioned and other operations.

Figure 5:
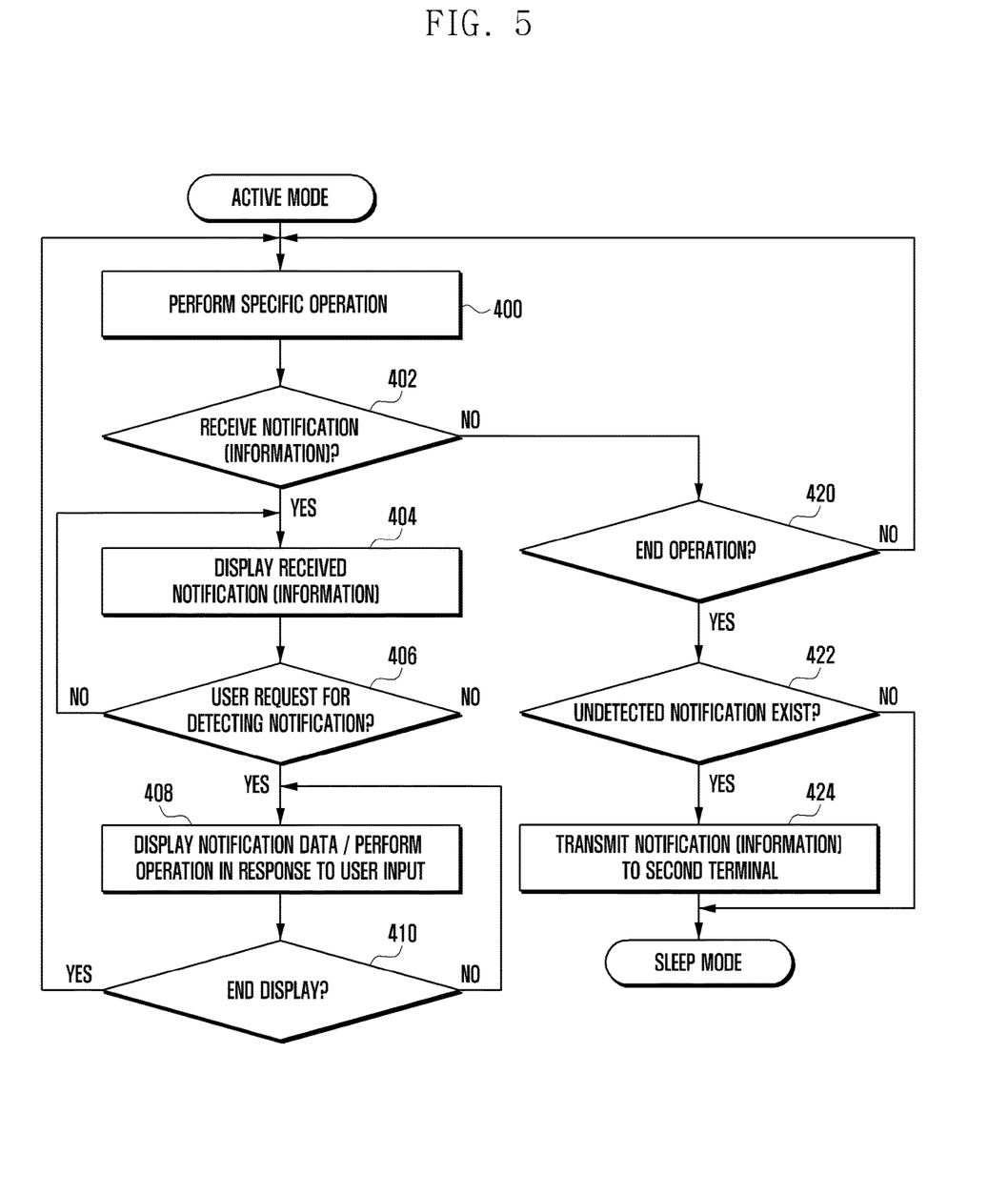
FIG. 5 is a flowchart illustrating a notification (information) provision method of an electronic device according to an embodiment of the present disclosure.

FIG. 5 is a flowchart illustrating a notification (information) provision method of an electronic device according to an embodiment of the present disclosure.

In the following, the description is made with reference to FIGS. 1 and 5. However, it is obvious to those skilled in the art that the present disclosure may be implemented with the configurations of FIGS. 2, 3, and 4. In the following, the description is directed to a case where the first terminal 10 receives a notification (information) from the server 30 in FIG. 1. However, the present disclosure may encompass the case where the second terminal 20 receives the notification (information) from the server 300. In the embodiment of FIG. 5, it is assumed that the first terminal 10 as an electronic device is a primary electronic device which receives the notification (information) from the server 300 and the second terminal 20 as another electronic device is a secondary electronic device capable of receiving the notification (information) from the first terminal 10.

Accordingly, FIG. 5 is depicted under the assumption of the state where the first and second terminals 10 and 20 are connected through a channel or communication path established using a communication protocol. The communication channel may be a wired channel established using a wired communication protocol. The communication channel also may be a wireless channel established using a wireless communication protocol, such as Bluetooth, Wi-Fi, Wi-Fi Direct, Wireless USB, and the like. The following description is directed to the operation in the state where a communication channel or path is established between the first and second terminals 10 and 20 using a communication protocol.

FIG. 5 is directed to the operations of the first terminal in an active mode. Assuming that the first terminal is a smartphone, the active mode may be the state where the display unit 14 of the first terminal 10 is on and the input unit 12 of the first terminal 10 is unlocked. The active mode may be the state capable of receiving a user request and performs an operation corresponding to the user request.

Referring to FIG. 5, at operation 400, the control unit 11 of the first terminal 10 performs a specific operation requested by the user, the display unit 14 of the first terminal is on, and the input unit 12 of the first terminal is unlocked.

The control unit 11 of the first terminal detects whether a notification (information) transmitted by the server 30 is received by the communication unit 13 at operation 402. The notification (information) may be of text message, instant message in chat, system information, application update message, or any of various push messages. If the notification (information) is received at operation 402, the procedure goes to operation 404 and, otherwise, operation 420.

At operation 404, the control unit 11 of the first terminal 10 controls the display unit 130 to display the received notification (information) in the active mode. At this time, the notification (information) is not transferred to the second terminal 20. Since the first terminal 10 in the active mode does not transmit the received notification (information) to the second terminal 20, it is possible to reduce unnecessary message transmission and thus avoid unnecessary waste of power. This results in increase of the standby times of the first and second terminals 10 and 20.

At operation 404, the display unit 14 of the first terminal 10 may display the notification (information) during a certain period, especially in the case of a smart phone, at an indicator area presenting the operation state of the smart phone at the top of LCD panel. The notification (information) may be displayed at the center of the display unit 14 of the first terminal 10 or in the form of a popup window. In any case, it may be configured to display the notification (information) during a certain period or constantly. In the following, the description is made under the assumption that the notification (information) is displayed during a certain period for convenience sake.

It may be configure that, when the notification (information) is not detected by the user even when the certain period has elapsed (e.g., if no user input for detecting the notification (information) is detected), the notification (information) indicator disappear.

Thereafter, the control unit 11 of the first terminal 10 determines whether a user input for detecting the notification (information) is made through the input unit 12 at operation 406. If the user input for detecting the notification (information) is detected, the procedure goes to operation 408 and, otherwise, returns to operation 404.

At operation 408, the control unit 11 of the first terminal 10 controls such that the displayed content is replaced by the notification (information) data received from the server 30. Afterward, the control unit 11 of the first terminal performs the operation corresponding to the user input made with the input unit 12 of the first terminal 10. For example, the notification (information) received from the server 30 is a text message notification, the control unit 11 controls to compose a reply in response to the message according to the user input made with the input unit 12 of the first terminal 10. In addition, if the notification (information) is of notifying of update of a specific application, the control unit 110 may control to perform an update procedure. In this way, operation 408 may be performed in various manners depending on the received notification (information).

In the state of performing operation 408, the control unit 11 determines whether a request for terminating the display of the notification (information) data is input through the input unit 12 at operation 410. If the notification (information) data display termination request is detected at operation 410, the control unit 11 returns the procedure to operation 400 and, otherwise, operation 408.

A description of the case where the procedure goes from operation 410 to operation 400 is provided below. Suppose that a specific application executed by the user has been running, e.g., if a movie has been played, and the notification (information) received at operation 402 is a text message notification. Then the control unit 11 may control to resume the application which has been running at operation 400, i.e., the playback of the movie, after detecting the message and transmitting a reply at operation 408. In another example, if the operation performed at operation 400 is not of requiring execution of any specific application, i.e., if a standby screen has been displayed, and if the procedure goes from operation 410 to operation 400, the control unit 11 may control the display unit 140 to switch the current screen to the standby screen.

In the case that the procedure goes from operation 402 to operation 420, the control unit 11 determines whether a request for terminating the operation executed at operation 400 is detected. For example, the operation executed at operation 400 may be of the state that the display unit 14 is on and the input unit 12 is unlocked. Accordingly, if operation 400 is terminated, this may mean that the active mode ends. If the active mode termination is request, the display unit 14 of the first terminal 10 is switched to the lock mode and/or turned off.

In the following, a description is made of the case where a sleep mode is requested. For example, the sleep mode may be the state where the display unit 14 is turned offed and/or not specific action is not taken for saving power.

If the sleep mode is requested at operation 420, the control unit 11 determines whether there is any notification (information) received from the server 30 but not detected yet at operation 422. In the case of the text message, an indicator indicating whether the user has detected any notification (information) received from the server 30 may be provided. If it is determined that there is any notification (information) undetected yet, the procedure goes to operation 424 and, otherwise if there is no notification (information) undetected, the control unit 11 controls to enter the sleep mode immediately.

At operation 424, the control unit 11 transmits the second terminal 20 the undetected notification (information) using the communication unit 13 of the first terminal 10. For the case of transmitting the undetected notification (information) to the second terminal 20, the second terminal 20 may be configured to display the undetected notification (information) on the display unit 24 and/or alert the user of the receipt or existence of the undetected notification (information) at the second terminal 20 using a sound or vibration. Alternatively, the first terminal 10 in the active mode may transmit the undetected notification (information) to the second terminal 20 with configuration instructing to take no specific action in receiving the undetected notification (information). For example, the first terminal 10 may transmit the undetected notification (information) to the second terminal with the configuration instructing to do not display any popup or output sound and/or vibration.

Hereinabove, the description has been made under the assumption of the active mode where the display unit 14 of the first terminal 10 is turned on and the input unit 12 of the terminal 10 is unlocked. Alternatively, the first terminal may be provided with, as an accessary, a case having a lid for protecting the display unit 14 of the first terminal 10 or a lid for protecting the display unit 14. In this case, the active mode may be the state where the lid is opened. Whether the lid is opened or closed may be detected using a sensor. The sensor module 340 of FIG. 3 may include an extra sensor, such as a hole sensor (not shown in drawing) for detecting the state of the lid. In an embodiment of the present disclosure, the active mode may be the state where, if it is possible to detect the state of the lid, the lid is opened.

Figure 6:
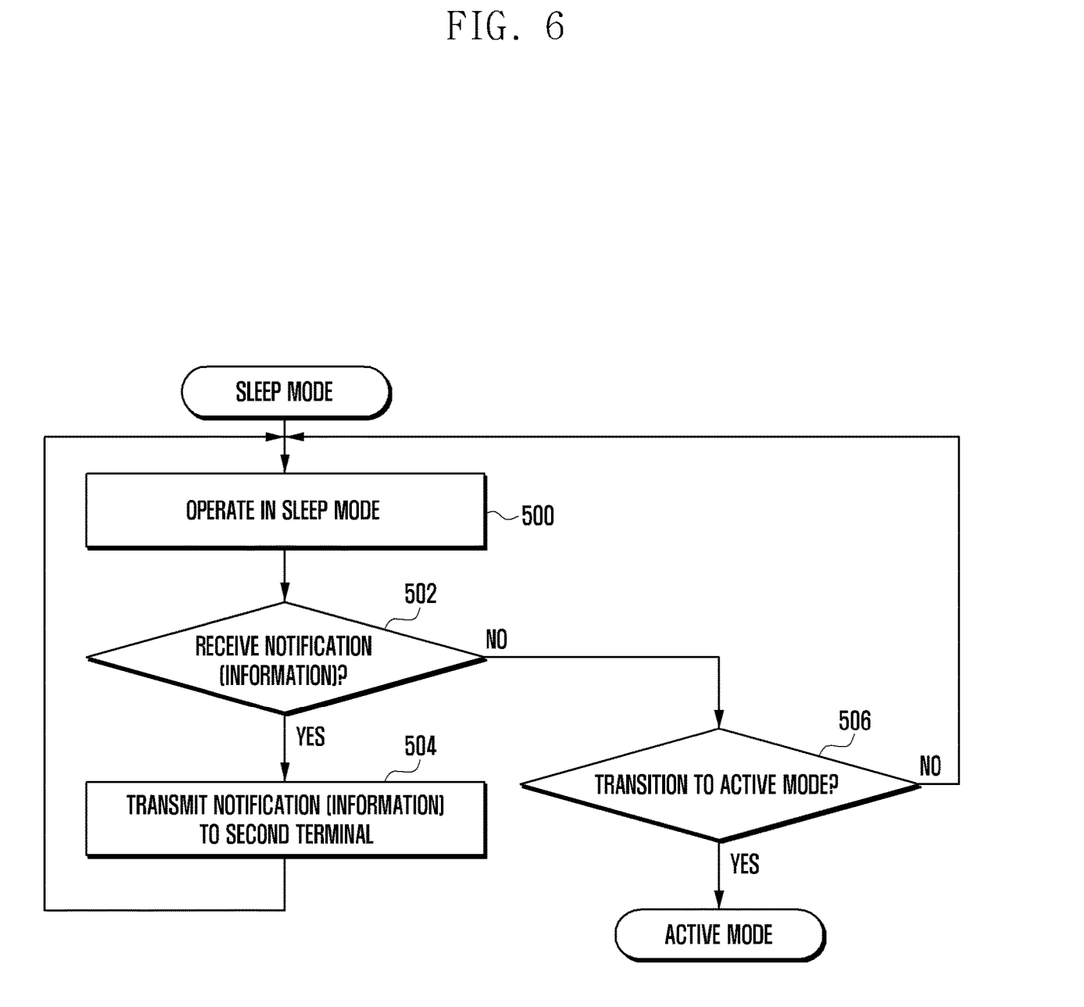
FIG. 6 is a flowchart illustrating a notification (information) provision method of an electronic device according to an embodiment of the present disclosure.

FIG. 6 is a flowchart illustrating a notification (information) provision method of an electronic device according to an embodiment of the present disclosure.

In the following, the description is made with reference to FIGS. 1 and 6. However, it is obvious to those skilled in the art that the present disclosure may be implemented with the configurations of FIGS. 2, 3, and 4. In the following, the description is directed to a case where the first terminal 10 receives a notification (information) from the server 30 in FIG. 1. However, the present disclosure may encompass the case where the second terminal 20 receives the notification (information) from the server 300. In the embodiment of FIG. 6, it is assumed that the first terminal 10 as an electronic device is a primary electronic device which receives the notification (information) from the server 300 and the second terminal 20 as another electronic device is a secondary electronic device capable of receiving the notification (information) from the first terminal 10.

Accordingly, FIG. 6 is depicted under the assumption of the state where the first and second terminals 10 and 20 are connected through a channel or communication path established using a communication protocol. The communication channel may be a wired channel established using a wired communication protocol. The communication channel also may be a wireless channel established using a wireless communication protocol, such as Bluetooth, Wi-Fi, Wi-Fi Direct, Wireless USB, and the like. The following description is directed to the operation in the state where a communication channel or path is established between the first and second terminals 10 and 20 using a communication protocol.

FIG. 6 is directed to the operations of the first terminal 19 in a sleep mode. Assuming that the first terminal is a smartphone, the sleep mode may be the state where the display unit 14 of the first terminal 10 is turned and the input unit 12 of the first terminal 10 is locked. As described above, the first terminal may be provided with, as an accessary, a case having a lid for protecting the display unit 14 of the first terminal 10 or a lid for protecting the display unit 14. In this case, the sleep mode may be the state where the lid is closed. Whether the lid is opened or closed may be detected using a sensor. The sensor module 340 of FIG. 3 may include an extra sensor, such as a hole sensor (not shown in drawing) for detecting the state of the lid. In an embodiment of the present disclosure, the sleep mode may be the state where, if it is possible to detect the state of the lid, the lid is closed.

Referring to FIG. 6, the control unit 11 of the first terminal is operating in the sleep mode at operation 500. For example, the sleep mode may be the state where the state where the display unit 14 and the input unit 12 of the first terminal 10 power off to minimize the power consumption as far as possible. However, at least one module of the communication unit 13 of the first terminal 10 has to maintain the turn-on state or wakes up from the sleep state periodically to receive any notification (information) from the server 30.

The control unit 11 of the first terminal 10 may determines whether any notification (information) is received by the communication unit 13 at operation 502. If any notification (information) is received at operation 502, the procedure goes to operation 504.

At operation 504, the control unit 11 of the first terminal 10 transmits the second terminal 20 the notification (information) using the communication unit 13. At this time, the control unit 11 may store the notification (information) in the memory 14 of the first terminal 10. The control unit 11 of the first terminal 10 may transmit the notification (information) with a configuration instructing the second terminal 20 to display the notification (information) in the form of a popup and/or alert the user of the of the receipt of the notification (information) with sound and/or vibration. Thereafter, the control unit 11 of the first terminal 10 returns the procedure to operation 500.

In the case that the procedure goes from operation 502 to operation 506, the control unit 11 of the first terminal 10 determines whether a request for transition to the active mode is received at operation 506. If the active mode transition request is received, the control unit 11 controls to transition from the sleep mode to the active mode. Otherwise if no active mode transition request is received, the procedure goes to operation 500 such that the first terminal 10 stays in the active mode.

As described above, the transition from the sleep mode to the active mode may occur in various situations. For example, the mode transition occurs when it is requested to turn on the display unit 14 or unlock the input unit 12 of the first terminal 10. As described above, the first terminal may be provided with, as an accessary, a case having a lid for protecting the display unit 14 of the first terminal 10 or a lid for protecting the display unit 14. In this case, mode transition may occur when the lid is opened. Whether the lid is opened or closured may be detected by a sensor.

In the case that the first terminal 10 is the primary electronic device receiving the notification (information) and the second terminal 20 is the secondary electronic device receiving the notification (information) from the first terminal 10 as in the various embodiments of FIGS. 5 and 6, it is possible to reduce overhead caused by unnecessary notification (information) transmissions and configure the notification provision operation to meet the user requirement. Since the notification (information) is delivered to on representative electronic device among a plurality of electronic devices connected to each other, it is possible to reduce the power consumption of the individual electronic devices and, particularly in the case of mobile terminal, prolong its standby time.

FIGS. 5 and 6 are directed to the case where the operation mode, i.e., active mode or sleep mode, of the terminal has been determined. However, the present disclosure may be embodied in such a way that the terminal or electronic device detects the current operation mode, when any notification (information) is received from the server, and performs an operation depending on the current mode. For example, the terminal or electronic device may detect the current operation mode, when any notification (information) is received form the server and, if the current operation mode is the active mode, perform operation 404 and, otherwise if the current operation mode is the sleep mode, operation 504. It is obvious to those in the art that the above-described operations may be applicable to this case.

As described above, the notification provision method of the present disclosure is advantageous, in a situation where a notification (information) is received by one of a plurality of electronic devices connected through wires and/or wirelessly, in terms of reducing unnecessary information transmissions by allowing the most user accessible electronic device to provide the user with the notification (information). In addition, the notification provision method of the present disclosure is advantageous in terms of reducing unnecessary power consumption and prolonging the standby time of the portable electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a user with information received by a first electronic device, the method comprising:
    establishing a first wireless communication path with at least one second electronic device using a communication protocol;
    identifying whether a notification is received via a second wireless communication path;
    in response to receiving the notification via the second wireless communication device, identifying, by the first electronic device, a current state of the first electronic device;
    in a case that the current state of the first electronic device is identified as a first mode;
        displaying the notification received via the second wireless communication path; and
    in a case that the current state of the first electronic device is identified as a second mode;
        transmitting the notification received via the second wireless communication path to the at least one second electronic device through the first wireless communication path;
    wherein the notification transmitted to the at least one second electronic device via the second wireless communication path is displayed at the at least one second electronic device.

2. The method of claim 1, wherein the first mode comprises at least one of a state where a display device of the first electronic device is on, a state where an input device of the first electronic device is unlocked, a state where a lid of the first electronic device is opened, or a state where the first electronic device is in an active mode.

3. The method of claim 1, wherein the second mode comprises at least one of a state where a display device of the first electronic device is off, a state where an input device of the first electronic device is locked, a state where a lid of the first electronic device is closed, or a state where the first electronic device is in a sleep mode.

4. The method of claim 1, wherein the communication protocol comprises one of Bluetooth, Wireless Fidelity (Wi-Fi), Wi-Fi Direct, or Wireless Universal Serial Bus (USB).

5. The method of claim 1, further comprising:
    determining, in a case that a request for transitioning from the first mode to the second mode is detected, whether any undetected notification received in the first mode exists; and
    transmitting, in a case that any undetected notification exists, the undetected notification to the at least one second electronic device through the first wireless communication path.

6. The method of claim 5, further comprising transmitting, along with the undetected notification, a message instructing the at least one second electronic device to alert the receipt of the notification using at least one of a popup window, sound, or vibration.

7. The method of claim 6, wherein the notification received via the second wireless communication path comprises at least one of a text message, an instant message, system information, or an application update message.

8. The method of claim 1, wherein the displaying of the notification received via the second communication path further comprises displaying the notification during a certain period.

9. The method of claim 1, wherein the displaying of the notification received via the second communication path further comprises displaying the notification at an indicator area indicating a state of the first electronic device.

10. The method of claim 1, further comprising storing the notification in a memory.

11. The method of claim 1, further comprising displaying, in a case that a request for detecting the notification is detected, data associated with the notification received via the second wireless communication path.

12. A first electronic device for providing a user with notification received from a server, the first electronic device comprising:
    a first communication unit configured to receive the notification from the server;
    a second communication unit configured to communicate with at least one second electronic device using a communication protocol;
    a display unit configured to display a state of the first electronic device and operation progress;
    an input unit configured to generate a signal corresponding to an input made by a user; and
    at least one processor configured to:
        control the second communication unit to establish a second wireless communication path with the at least one second electronic device using a communication protocol,
        identify whether a notification is received via a first wireless communication path established with the first communication unit;
        identify, in response to receiving the notification via the second wireless communication path of the first communication unit, the current state of the first electronic device,
        in a case that the current state of the first electronic device is identified as a first mode:
            control the display unit to display the notification received via the first wireless communication path, and
        in a case that the current state of the first electronic device is identified as a second mode:
            control the second communication unit to transmit the notification received via the first wireless communication path to the at least one second electronic device through the second wireless communication path, wherein the received notification transmitted to the second electronic device via the second wireless communication path of the second communication unit is displayed on a display of the at least one second electronic device.

13. The first electronic device of claim 12, wherein the first mode comprises at least one of a state where a display unit of the first electronic device is on, a state where an input unit of the first electronic device is unlocked, a state where a lid of the first electronic device is opened, or a state where the first electronic device is in an active mode.

14. The first electronic device of claim 12, wherein the second mode comprises at least of a state where the display unit of the first electronic device is off, a state where the input unit of the first electronic device is locked, a state where a lid of the first electronic device is closed, or a state where the first electronic device is in a sleep mode.

15. The first electronic device of claim 12, wherein the communication protocol comprises one of Bluetooth, Wireless Fidelity (Wi-Fi), Wi-Fi Direct, or Wireless Universal Serial Bus (USB).

16. The first electronic device of claim 12, wherein the at least one processor is further configured to:
  determine, if a request for transitioning from the first mode to the second mode is detected, whether any undetected notification received in the first mode exists, and
  control the second communication unit to transmit, if any undetected notification exists, the undetected notification to the at least one second electronic device through the second wireless communication path.

17. The first electronic device of claim 16, wherein the at least one processor is further configured to control the second communication unit to transmit, along with the undetected notification, a message instructing the at least one second electronic device to alert the receipt of the notification using at least one of a popup window, sound, or vibration.

18. The first electronic device of claim 17, wherein the notification comprises at least one of a text message, an instant message, system information, or an application update message.

19. The first electronic device of claim 12, wherein the at least one processor is further configured to control the display unit to display the notification during a certain period.

20. The first electronic device of claim 12, wherein the at least one processor is further configured to control the display unit to display the notification at an indicator area indicating a state of the first electronic device.

21. The first electronic device of claim 12, further comprising a memory configured to store the notification,
  wherein the at least one processor is further configured to control the memory to store the notification received in at least one of the first and second modes.

22. The first electronic device of claim 12, wherein the at least one processor is further configured to control the display unit to display, if a request for detecting the notification made by a user is detected through the input device, data of the received notification.

* * * * *